REVERSIBLE ANALOG TO DIGITAL CONVERTER

Filed May 15, 1963 7 Sheets-Sheet 1

INVENTORS
PHILIP A. HOFFMAN
McKENNY W. EGERTON, JR.

BY

Le Blanc and Shur
ATTORNEYS

REVERSIBLE ANALOG TO DIGITAL CONVERTER

Filed May 15, 1963 7 Sheets-Sheet 2

INVENTORS
PHILIP A. HOFFMAN
McKENNY W. EGERTON, JR.

BY Le Blanc and Shur

ATTORNEYS

May 10, 1966 P. A. HOFFMAN ETAL 3,251,052

REVERSIBLE ANALOG TO DIGITAL CONVERTER

Filed May 15, 1963 7 Sheets-Sheet 3

INVENTORS
PHILIP A. HOFFMAN
McKENNY W. EGERTON, JR.

BY *Le Blanc and Shur*
ATTORNEYS

INVENTORS
PHILIP A. HOFFMAN
McKENNY W. EGERTON, JR.
BY
Le Blanc and Shur
ATTORNEYS

REVERSIBLE ANALOG TO DIGITAL CONVERTER

Filed May 15, 1963 7 Sheets-Sheet 5

INVENTORS
PHILIP A. HOFFMAN
McKENNY W. EGERTON, JR.
BY
Le Blanc and Shur
ATTORNEYS INVENTORS
PHILIP A. HOFFMAN
McKENNY W. EGERTON, JR.
BY
Le Blanc and Shur
ATTORNEYS

REVERSIBLE ANALOG TO DIGITAL CONVERTER

Filed May 15, 1963 7 Sheets-Sheet 7

INVENTORS
PHILIP A. HOFFMAN
McKENNY W. EGERTON, JR.
BY
Le Blanc and Shur
ATTORNEYS United States Patent Office 3,251,052

Patented May 10, 1966

3,251,052

REVERSIBLE ANALOG TO DIGITAL CONVERTER

Philip A. Hoffman, Towson, and McKenny W. Egerton, Jr., Owings Mills, Md., assignors to Towson Laboratories Inc., Towson, Md., a corporation of Maryland Filed May 15, 1963, Ser. No. 280,624

17 Claims. (Cl. 340—347)

This invention relates to charge transfer electronic converters and more particularly to a reversible logarithmic converter which generates a digital output that represents the logarithm of the analog input voltage or an analog output voltage representative of the antilog of the digital input pulse train.

Logarithmic converters have been known for some time. They are useful in a wide variety of areas, particularly in companded voice encoding and as digital computer input and output devices. Converters of this type are also useful in controlling machinery. A major advantage of logarithmic converters arises from the difficulty involved in attempting to multiply or divide digital numbers with electrical or mechanical equipment. Multiplication or division may be accomplished with the outputs of logarithmic converters by simply adding or subtracting the logarithms of the numbers while in digital form. In voice transmission, logarithmic companding improves the signal to noise ratio.

Insofar as applicants are aware, the present invention provides the first simplified logarithmic converter of the successive approximation type which produces an output which is the true logarithm or antilog of the input with an ideal accuracy which is within the resolution represented by the least significant digit, and which involves no mathematical approximation.

It is therefore a primary object of the present invention to provide a novel logarithmic converter.

Another object of the present invention is to provide a reversible logarithmic converter.

Another object of the invention is to provide a logarithmic analog to digital converter.

Another object of the present invention is to provide a logarithmic converter which involves no mathematical approximation within the accuracy of the converter.

Another object of the invention is to provide a companded converter.

These and further objects and advantages of the invention will be more apparent upon reference to the following specification, claims and appended drawings, wherein:

The term reversible converter is used to mean a converter which produces a digital output representing the logarithm of the analog input and which same converter produces an analog output which is the antilog of the digital input.

In order to facilitate an understanding of the present invention a few properties of logarithms will first be briefly pointed out. The logarithm of a number is usually expressed as:

$$y=\log_p e_a \qquad (1)$$

where $p$ is the base of the logarithm. For most applications of analog to digital converters, the digital output is required to be a binary number, and also the number of bits, the maximum analog input voltage $e_{max}$, and the minimum analog input voltage $e_{min}$ are given. Thus in Equation 1, $e_a$ represents the analog input voltage which may be encoded throughout the range from $e_{min}$ to $e_{max}$, and $y$ represents the digital output. Moreover, the action of the converter limits $y$ to discrete digital values. That is, if there are $b$ digits in the digital output number, the range between $e_a=0$ and $e_a=e_{max}$ is composed of $2^b$ separate levels as represented at the digital output, provided all possible binary numbers are generated by the converter as the analog input voltage varies from one extreme of its range to the other. In order to accomplish this objective, Equation 1 must be modified to $$Y=\log_p \frac{e_a}{e_{min}} \qquad (2)$$

Equation 2 assures that $y=00\ldots00$, when $e_a=e_{min}$. Also it will become clear later that this value of digital output will occur for all values of $e_a$ which are less than $p^{.5}e_{min}$. Moreover, the number $p$ must be chosen so that $y=11\ldots11$ when $$e_a > p^{2^{b}-3/2}\, e_{min}$$

By these means, all possible binary numbers, or codes, are used.

*Table I*

| y: | $e_a$ |
|---|---|
| 0000 | $p^{.5}e_{min}$ (or less). |
| 0001 | $p^{.5}e_{min}$ to $p^{1.5}e_{min}$. |
| 0010 | $p^{1.5}e_{min}$ to $p^{2.5}e_{min}$. |
| ---- | -------------------- |
| 1111 | $p^{14.5}e_{min}$ (or greater). |

Figure 1:
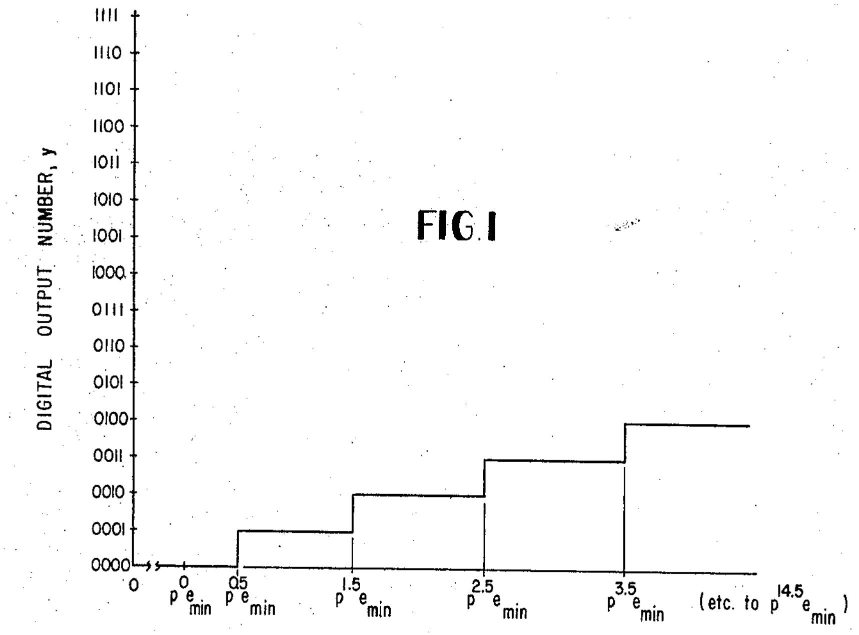
FIGURE 1 is a plot of digital output number versus logarithmic multiplier for a four bit binary system constructed in accordance with the present invention.

The first few levels in Table I are shown diagrammatically in FIGURE 1. In Table I and FIGURE 1, it has been assumed for illustration that there are four digits in the output number, but any number of digits may be used which is compatible with the resolution and input voltage range of the converter.

Two modes of operation of the converter are possible. In one mode, switching and charge transfer operations are performed on the analog input voltage; in the other mode, switching and charge transfer operations are performed on the reference voltage.

The switching and charge transfer operations which were mentioned in the preceding paragraph result in multiplications of the charge on a capacitor by factors which may be greater or less than unity. Stated differently, the switching and charge transfer operations result in multiplications or divisions of the charge on a capacitor. The magnitudes of the factors by which the charge is multiplied or divided will be described later.

Figure 4:
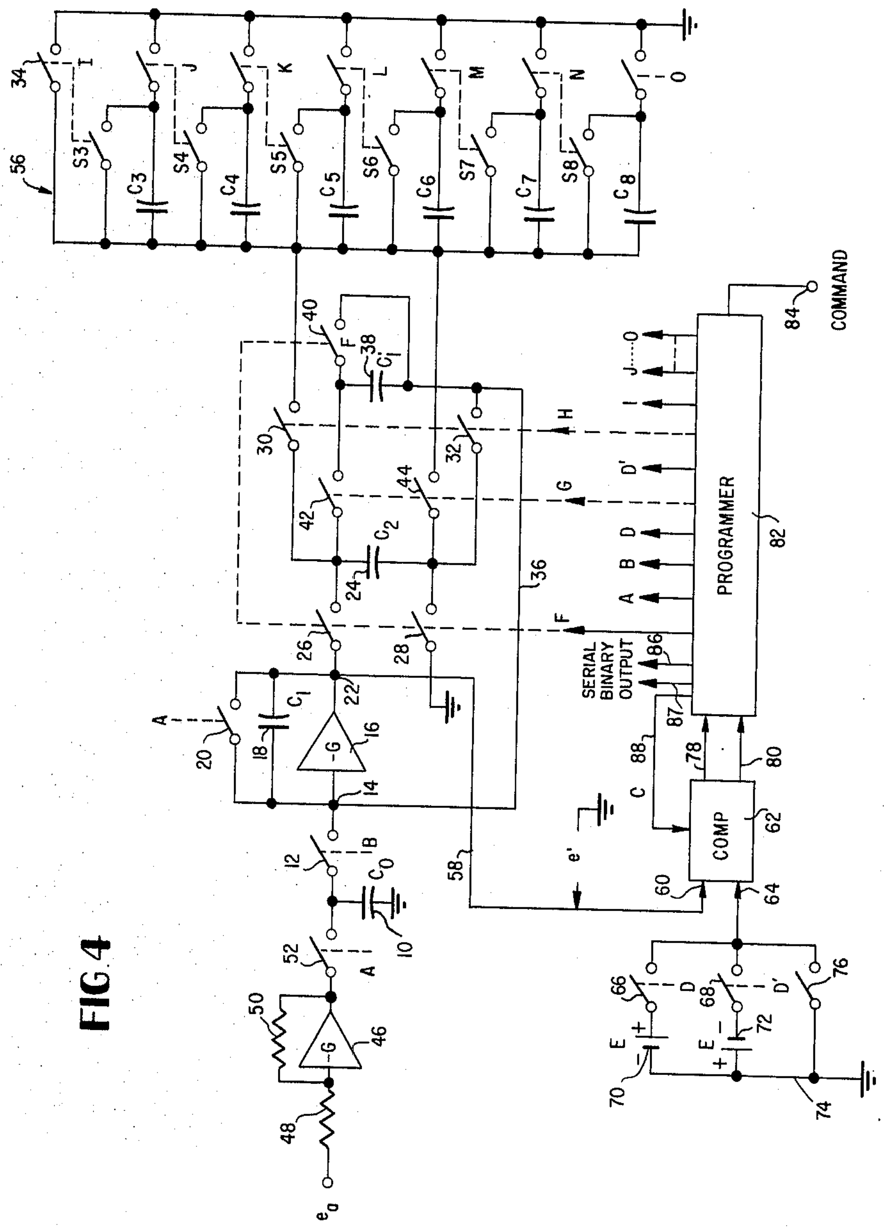
FIGURE 4 is a circuit diagram of a complete analog to digital converter constructed in accordance with the present invention.

For analog to digital conversion according to the first mode of operation, a charge proportional to the analog input voltage is placed on a capacitor in a charge transfer circuit. In FIGURE 4, for example, this capacitor is labelled $C_1$. The voltage across the charge transfer capacitor ($C_1$) will be called $e'$. The voltage across this capacitor which corresponds to $p^{-1/2}$ times the value of $e'$ which causes the output code to change from 0000 to 0001 is defined as $e_{min}$. The value of $e'$ which is equal to $$p^{2^{b-1}}e_{min}.$$

is defined as $e_{max}$. A reference voltage E is selected which is equal to the geometric mean of $e_{min}$ and $e_{max}$. That is, $$E=(e_{max}\cdot e_{min})^{1/2} \quad (3)$$

To perform an analog to digital conversion according to the first mode of operation, the voltage $e'$ is compared with the voltage E by means of a comparator. If $e'$ is greater than E, a binary one is recognized and $e'$ is divided by the factor $$p^{2^{b-2}}$$

where, as before, $b$ is the number of bits in the digital output number, and $p$ is the base of the logarithm. In this case, the most significant bit in the digital output number is recognized to be 1. On the other hand, if $e'$ is less than E, a binary 0 is recognized and $e'$ is multiplied by the factor $$p^{2^{b-2}}$$

To determine the second most significant digit, a second comparison is made. If the value of $e'$ (after determination of the most significant digit and the resultant multiplication or division) is larger than E, a binary one is recognized and $e'$ is divided by the factor $$p^{2^{b-3}}$$

while if $e'$ is less than E, a binary zero is recognized and $e'$ is multiplied by this factor. Similar procedures are performed for the other digits in the output number. In general, each division represents a binary 1 in the digital output number and each multiplication represents a binary 0. The factors for the successive digits are given in Table II, where a positive exponent indicates a multiplication, and a negative exponent indicates a division. It is to be noted that the number $p$ in general is greater than unity, since the most useful logarithms have bases which are greater than unity. Therefore, the factors in Table II which have positive exponents are also greater than unity. On the other hand, factors which have negative coefficients are less than unity, and are in fact the reciprocals of the factors which have positive coefficients.

*Table II*

| Quantity bit period: | Multiplier |
|---|---|
| 1st | $p^{\pm 2^{b-2}}$ |
| 2nd | $p^{\pm 2^{b-3}}$ |
| 3rd | $p^{\pm 2^{b-4}}$ |
| ... | ... |
| Last | $p^{\pm 2^{-1}}$ |

It will now be demonstrated that the procedures described in the preceding paragraph produce a binary number which is the logarithm of the voltage initially placed on the charge transfer and storage capacitor. Since the magnitudes of the exponents in the factors in Table II decrease from one bit period to the next, and from the nature of the switching sequence, it follows that $e'$ will equal E to within one resolution element or less at the completion of an encoding, provided that $e_{min} \leq e_a \leq e_{max}$. Therefore, the following equation holds except for an error which is less than one resolution element. In order to simplify the following derivation, this error has been neglected, but the validity of the conclusion is not impaired thereby.

$$e_a M=E \quad (4)$$

where $$M=p^{\pm 2^{b-2}}\cdot p^{\pm 2^{b-3}} \ldots p^{\pm 2^{-1}} \quad (5)$$

In Equation 4, it has been assumed for simplicity that the circuit parameters have been chosen so that the initial voltage placed on capacitor $C_1$ is the same as the analog input voltage.

Since the digital output number contains $b$ digits, as noted previously, $$e_{max.}=e_{min.}p^{2^{b-1}} \quad (6)$$

From Equations 3, 4, and 6

$$e_a=e_{min.}\frac{p^{1/2(2^{b-1})}}{M} \quad (7)$$

Therefore $$\log_p\frac{e_a}{e_{min}}=\log_p p^{1/2(2^{b-1})}-\log_p\left(p^{\pm 2^{b-2}}\cdot p^{\pm 2^{b-3}} \ldots p^{\pm 2^{-1}}\right) \quad (8)$$

$$=\tfrac{1}{2}(2^{b-1})-(\pm 2^{b-2}\pm 2^{b-3}\pm \ldots \pm 2^{-1}) \quad (9)$$

However, $$\tfrac{1}{2}(2^{b-1})=\tfrac{1}{2}(2^{b-1}+2^{b-2}+ \ldots +2^0) \quad (10)$$

$$=2^{b-2}+2^{b-3}+ \ldots +2^{-1} \quad (11)$$

From Equations 9 and 11

$$\log_p\frac{e_a}{e_{min}}=(2^{b-2}+2^{b-3}+\ldots+2^{-1})-(\pm 2^{b-2}\pm 2^{b-3}+\ldots\pm 2^{-1}) \quad (12)$$

The terms in the two pairs of parentheses on the right hand side of Equation 12 may be combined by means of coefficients $a_i$ which are defined so that $a_i=1$ if the alternative minus sign is selected in the second pair of parentheses, but $a_i=0$ if the alternative plus sign is selected. It is clear that $$2^{b-2}-2^{b-2}=0$$

and that $$2^{b-2}+2^{b-2}=2^{b-1}$$

Therefore Equation 12 may be written:

$$\log_p\frac{e_a}{e_{min}}=a_{b-1}2^{b-1}+a_{b-2}2^{b-2}+\ldots a_0 2^0 \quad (13)$$

In Equation 13, $a_{b-1}$ for example is 1 if the minus sign is selected for the term $2^{b-2}$, but is 0 if the plus sign is selected. Similar statements apply for the other coefficients.

However, the right hand side of Equation 13 is simply the representation of a binary number having $b$ digits, and the digits are 1 or 0 depending upon the sign of the corresponding term in Equation 12. In other words a particular $a_i$ is 1 if it corresponds to a division, and is 0 if it corresponds to a multiplication.

It follows that switching operations which result in multiplications of $e'$ must be recognized as binary 0's, and that switching operations which result in divisions of $e'$ must be recognized as binary 1's in the binary number which represents $$\log_p\frac{e_a}{e_{min}}$$

In summary, a binary number which represents the logarithm of the analog input voltage is generated by successive multiplications and divisions of the analog input voltage in accordance with the rules previously described.

In the second mode of operation which was mentioned above, the switching operations are performed on the reference voltage. That is, if the reference voltage initially is larger than the analog input voltage, the reference voltage is divided by the first factor in Table II, and vice versa. Successive switching operations are performed which result in multiplications and divisions by the other factors listed in Table II. At the completion of an encoding, the multiplications and divisions have transformed the reference voltage to a value which differs from the analog input voltage by less than one resolution element. Therefore, instead of Equation 4, the following equation applies, subject to conditions similar to those which were stated for Equation 4, $$e_a = EM \qquad (14)$$

where M has the same meaning as in Equation 5. From Equations 3, 6, and 14

$$e_a = e_{min} \cdot p^{1/2(2^{b-1})} \cdot M \qquad (15)$$

from which $$\log_p \frac{e_a}{e_{min}} = \log_p p^{1/2(2^{b-1})} + \log_p (p \pm {}^{2^{b-2}} p \pm {}^{2^{b-3}} \ldots p^{2^{-1}} \qquad (16)$$

$$= \tfrac{1}{2}(2^{b-1}) + [\pm 2^{b-2} \pm 2^{b-3} \ldots + 2^{-1}] \qquad (17)$$

It will be noted that Equations 9 and 17 are the same exception for the sign preceding the parentheses. Hence the arguments similar to those which followed Equation 9 also apply to Equation 17.

As a check point for Equation 13, it may be noted that if all of the alternative plus signs are selected, $$a_{b-1}2^{b-1} + a_{b-2}2^{b-2} \ldots + a_0 2^0 \qquad (18)$$
$$= (2^{b-2} + 2^{b-3} + \ldots\ldots + 2^{-1}) - (+2^{b-2} + {}^{b-3} \ldots 2^{-1})$$

However, since all plus signs were selected, all $a_i$ must be recognized as 0. It will be noted that the two pairs of parentheses in the right hand side of Equation 18 cancel, and therefore Equation 18 results in $$0 = 0 \qquad (19)$$

The foregoing selection of signs is equivalent to setting $e_a = p^0 e_{min}$ in Table I. Therefore, Equation 2 becomes $$Y = \log_p \frac{p^0 e_{min}}{e_{min}} \qquad (20)$$

$$= \log_p = 0 \qquad (21)$$

which is in accordance with Equation 19.

For another check point, let all of the alternative minus signs in Equation 12 be selected. In this case, all $a_i$'s in Equation 13 must be recognized as binary 1's, and Equation 13 becomes $$11 \ldots 11 = 2(2^{b-2} + 2^{b-3} \ldots + 2^{-1}) \qquad (20)$$
$$= 2^{b-1} + 2^{b-2} \ldots + 2^0 \qquad (21)$$

The right hand side of Equation 21 is simply the representation of a binary number having $b$ digits in which all of the digits are 1. Therefore, the two sides of Equation 21 are equal, and Equation 13 is proved for this case. This selection of alternative signs is equivalent to setting $e_a = e_{max}$ in Table I.

Equation 2 therefore becomes $$Y = \log_p \frac{e_{max}}{e_{min}} = 11 \ldots 11 \qquad (22)$$

which is in accordance with Equation 21.

For a third check point for Equation 13, let alternative plus signs be selected for all terms except the last, and let the minus sign be selected for the last term. This selection requires that all of the binary digits except the least significant be 0, and that the least significant digit be 1. Therefore, Equation 13 yields $$00 \ldots 01 = (2^{b-2} + 2^{b-3} \ldots + 2^{-1}) - (+2^{b-2} + 2^{b-3} \ldots - 2^{-1})$$
$$= 2 \cdot 2^{-1}$$

Hence $$00 \ldots 01 = 1 \qquad (23)$$

This selection of alternative plus and minus signs is equivalent to setting $e_a = p^1 e_{min}$ in Table I. Therefore Equation 2 becomes $$Y = \log_p \frac{p e_{min}}{e_{min}}$$

$$= \log_p = 1 \qquad (24)$$

which is in accordance with Equation 23.

Additional check points may be tested, and in all cases it will be found that recognition of an alternative plus sign as a binary 0 and recognition of an alternative minus sign as a binary 1 proves Equation 13, and that the binary numbers formed from these digits are in accordance with Equation 2 and Table II. In a similar manner, Equation 17 may be tested with particular selections of plus and minus signs, and it will be found that the equation is verified in all cases. The details of the tests will not be given, since the procedures are the same as for Equation 13.

For digital to analog conversion, the digital input number is caused to perform multiplications and divsions on an initial or reference voltage which is placed on capacitor $C_1$ at the beginning of the encoding cycle. In particular, if the most significant quantity digit of the digital input number is 1, the initial voltage is multiplied by the first factor in Table II. Conversely, if the most significant quantity digit is 0, the initial voltage is divided by the first factor in Table II. For the second most significant quantity digit of the digital input number, the second factor in Table II is used, and so on for the remaining digits. The expression "quantity digit" is used to distinguish digits which determine magnitude from the digit which determines polarity. The polarity digit may precede or follow the quantity digits, but in the preferred embodiment of this invention, the polarity digit precedes the quantity digits.

Therefore, at the completion of a digital to analog conversion, the voltage across capacitor $C_1$ is given by Equation 14, where E is the initial or reference voltage, and where M is defined by Equation 5. As before, a plus sign in an exponent represents a multiplication corresponding to a binary 1, and a minus sign represents a division corresponding to a binary zero. It has previously been shown that Equation 14 may be transformed to Equation 17, and that the latter equation is valid if the alternative plus signs are identified with multiplications and the alternate minus signs are identified with divisions. For analog to digital conversions, the selection of a multiplication or division is determined by a comparator, whereas for a digital to analog conversion, the selection of a multiplication or division is determined by the particular binary digit which is being processed. It follows that if switching operations are performed in accordance with Equation 17 for a digital to analog conversion, the voltage across capacitor $C_1$ at the completion of a conversion will be $$\log_p \frac{e_a}{e_{min}} = N \text{ or } e_a = p^N e_{min} \qquad (25)$$

where N is the digital input number. The voltage $e_{min}$ has the same meaning as in Equations 3 and 6, and from these equations it may be proved that $$e_{min} = E p^{-1/2(2^{b-1})} \qquad (26)$$

Equation 25 may be written $$\frac{e_a}{e_{min}} = \log_p^{-1} N \qquad (27)$$

and therefore the digital to analog conversion process is the inverse of the analog to digital process.

The switching operations by which multiplications and divisions are performed will next be described. For this purpose, portions of a converter are shown in FIGURES 2 and 3.

Figure 2:
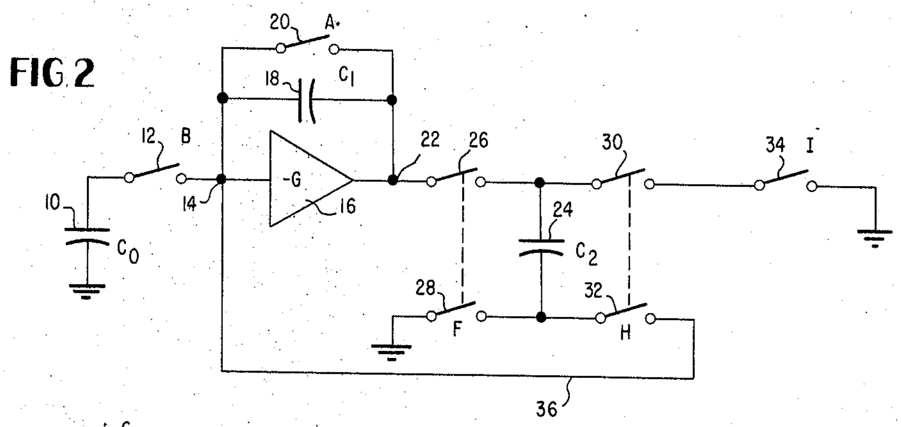
FIGURE 2 is a simplified circuit showing a first portion of a converter constructed in accordance with the present invention.
Figure 3:
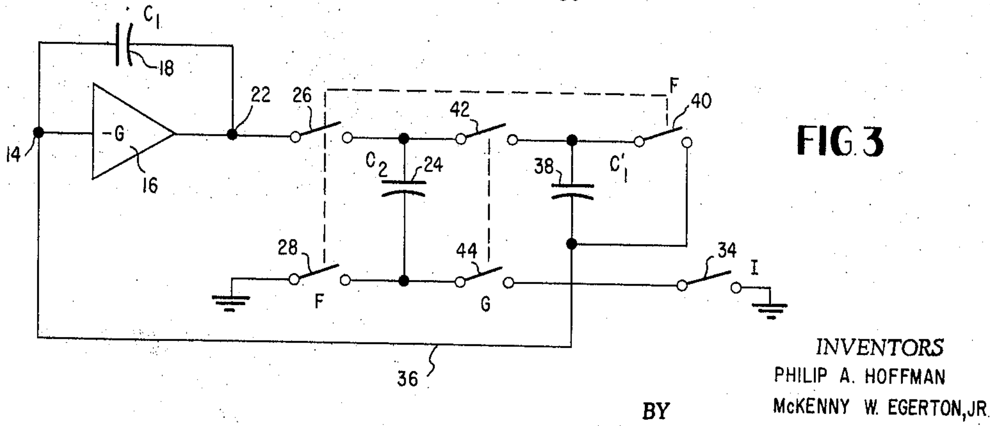
FIGURE 3 is a simplified circuit showing a second portion of the same converter.

In FIGURE 2, a capacitor 10 labelled $C_0$, upon which a charge has been placed, is connected between ground and a switch 12 labelled B. Switch 12 is normally open but when momentarily closed, connects capacitor 10 to the input terminal 14 of an operational amplifier 16 having a feedback capacitor 18 labelled $C_1$. A shorting switch 20 for discharging capacitor 18 is connected across the feedback capacitor.

The opposite sides of capacitor 24 are connected through ganged switches 26 and 28 labelled F to the output of the operational amplifier and to ground respectively. The two sides of capacitor 24 are also connected to ganged switches 30 and 32 labelled H. Switch 30 connects the top side of capacitor 24 through a further switch 34 labelled I to ground. Switch 32 connects the lower side of capacitor 24 by way of lead 36 to the input terminal 14 of the operational amplifier.

Assume that capacitor $C_0$ is initially charged to $-E_0$; that is, the upper terminal of the capacitor is negatively charged; capacitor $C_1$ is discharged by an operation of switch A. Next, switch B is closed and opened, and this operation transfers all of the charge on capacitor $C_0$ to $C_1$. The reason for this transfer can be seen physically from a consideration of the properties of a highly fed back amplifier. Capacitor $C_1$ provides a low-impedance feedback path for steep wavefronts or sharp pulses. It is well known that the input node of an amplifier with high feedback is maintained essentially at ground potential by feedback action. Therefore, when switch B is closed, both plates of capacitor $C_0$ are connected to points which are at ground potential; this means that the capacitor becomes discharged. Since the input impedance of the amplifier is high, all of the charge on $C_0$ flows into capacitor $C_1$, which becomes charged to a voltage $$+E_0\frac{C_0}{C_1}$$

The positive sign means that the right hand terminal of capacitor $C_1$ is positive with respect to the left hand terminal. Also, it will be assumed for simplicity that $C_0=C_1$, and therefore capacitor $C_1$ is charged to the voltage $+E_0$.

Now, if the two poles of switch F are closed and opened, capacitor $C_2$ is charged through the amplifier to the voltage $+E_0$ with the upper plate positive. The charge on $C_2$ therefore is $+E_0C_2$. Next, if switches H and I are closed and opened, all of the charge on capacitor $C_2$ is transferred to capacitor $C_1$ by the process previously described, and the total voltage across $C_1$ becomes $$e_{C_1}=E_0\left(1+\frac{C_2}{C_1}\right) \tag{28}$$

or $$e_{C_1}=E_0\left(\frac{C_1+C_2}{C_1}\right) \tag{29}$$

Therefore, the operations of switches F and H have multiplied the voltage $E_0$ by the factor $$\frac{C_1+C_2}{C_1}$$

It will be noted that this factor is greater than unity.

In FIGURE 2 and Equation 28, the charge on capacitor $C_2$ has been made to add to the initial charge on capacitor $C_1$, and thereby to increase the voltage across it. However, a different switching configuration can add a negative increment to the charge on capacitor $C_1$. This configuration is shown in FIGURE 3.

In FIGURE 3, like parts bear like reference numerals and this portion of the circuit of the converter again includes operational amplifier 16 with feedback capacitor 18. Also included are capacitor 24 and switches 26, 28 and 34. However, in FIGURE 3 an additional capacitor 38 labelled $C'_1$ is provided and has a separate shorting switch 40 for discharging capacitor 38. Switch 40 is also labelled F and is ganged with switches 26 and 28. Also provided are switches 42 and 44 labelled G, the former connecting the top side of capacitor 24 to the top side of capacitor 38 and the latter connecting the lower side of capacitor 24 through switch 34 to ground. Capacitor 38 has the same capacitance as capacitor 18 but is labelled $C'_1$ for the purpose of identification.

It will be assumed that capacitor $C_1$ is charged to the voltage $+E_0$ by means not shown, and that switch F is closed and opened; as before, this switching operation charges capacitor $C_2$ to $+E_0$, with the upper terminal positive; also, the third pole of switch F discharges capacitor $C'_1$. Then, when switches G and I are closed, charge flows because the lower terminals of capacitors $C'_1$ and $C_2$ are both connected to points which are at ground potential. The amount of charge which flows is determined by the equations $$\frac{Q_2}{C_2}=\frac{Q_1}{C_1} \tag{30}$$

$$Q_1+Q_2=C_2E_0 \tag{31}$$

In Equations 30 and 31, $Q_2$ is the charge which remains on capacitor $C_2$ when equilibrium has been reached, and $Q_1$ is the charge which passes to capacitor $C'_1$ and therefore to capacitor $C_1$. From these equations, it follows that $$E_{C_1}=E_0\left(\frac{C_1}{C_1+C_2}\right) \tag{32}$$

Therefore, the operations of switches F and G have multiplied the voltage $E_0$ by the factor $$\frac{C_1}{C_1+C_2}$$

or in other words these switching operations have divided the voltage $E_0$ by $$\frac{C_1+C_2}{C_1}$$

It will be noted that the factor $$\frac{C_1}{C_1+C_2}$$

is less than unity.

It will be observed further, that the factors in the right hand sides of Equations 29 and 32 are reciprocals of each other. Thus, the circuits in FIGURES 2 and 3 provide means whereby the voltage on capacitor $C_1$ may be multiplied by a desired factor or divided by the same factor. It will be explained later that other capacitors may be connected in series with capacitor $C_2$ in which case $C_2$ must be replaced by $$C=\frac{C_sC_2}{C_s+C_2} \tag{33}$$

where $C_s$ is the series capacitor. By suitable choices of $C_1$, $C_2$, and $C_s$, the factor in Table II may be obtained.

A complete logarithmic analog to digital converter is shown in diagrammatic form in FIGURE 4. This converter will produce a 9-bit output number which is composed of one polarity bit and eight quantity bits.

In FIGURE 4, the analog input voltage $e_a$ is supplied to the input resistor 48 of the operational amplifier 46. Means for sampling the analog input voltage and for placing an initial charge proportional to this voltage on $C_1$ are shown. These means include amplifier 46, resistors 48 and 50, switches 52 and 12, and capacitor 10. Additional sampling and charging circuits may be provided for multiplexed operations, and multiplexing will be described more fully later on. The analog input voltage may come from a strain gauge, pressure transducer, microphone, or any source of analog voltage to be converted.

In FIGURE 4, switch 34 labelled I forms a portion of an attenuator generally indicated at 56 which includes additional switches J and K through 0. The attenuator also includes a plurality of capacitors labelled $C_3$ through $C_8$, and appropriate shorting switches for discharging each of these capacitors, labelled $S_n$, where $n$ is the number of the capacitor associated with the switch. Switch I is ganged with switch $S_3$, switch J is ganged with switch $S_4$, and so on as shown in FIGURE 4. Stated differently, capacitors $C_3$ through $C_8$ represent the series capacitors $C_s$ which were mentioned in connection with Equation 33.

The output terminal 22 of the operational amplifier 16 is connected by way of lead 58 to one input 60 of a comparator 62. The voltage between lead 58 and ground is indicated as $e'$. The other input 64 of the comparator is connected through switches 66 and 68 labelled D and D′ respectively to a pair of reference potential sources indicated by batteries 70 and 72. The negative terminal of battery 70 and the positive terminal of battery 72 are connected to ground by way of lead 74. Also, a third switch 76 connects the input terminal 64 of the comparator to ground.

The two outputs 78 and 80 of the comparator feed a programmer 82 which controls all the switches and includes a plurality of outputs labelled $A$–0 for controlling operation of the switches similarly labelled. Operation of the programmer is initiated by a command pulse supplied to programmer input terminal 84. A digital binary representation of the logarithm of the analog input appears at the programmer output at 86. The one's complement of the digital output appears at wire 87 from the programmer. A series of trigger pulses labelled C are supplied from the programmer to the comparator by way of lead 88.

As can be seen from FIGURE 4, the output of the operational amplifier 16 is connected to one input of the comparator 62 and the other input of the comparator is connected to ground or to a reference potential supplied by either battery 70 or battery 72. As previously noted, the voltage of each battery is made equal to the geometric mean of the specific maximum and minimum analog input voltage. That is $$E=(e_{\min}\cdot e_{\max})^{1/2} \qquad (3)$$

Figure 5:
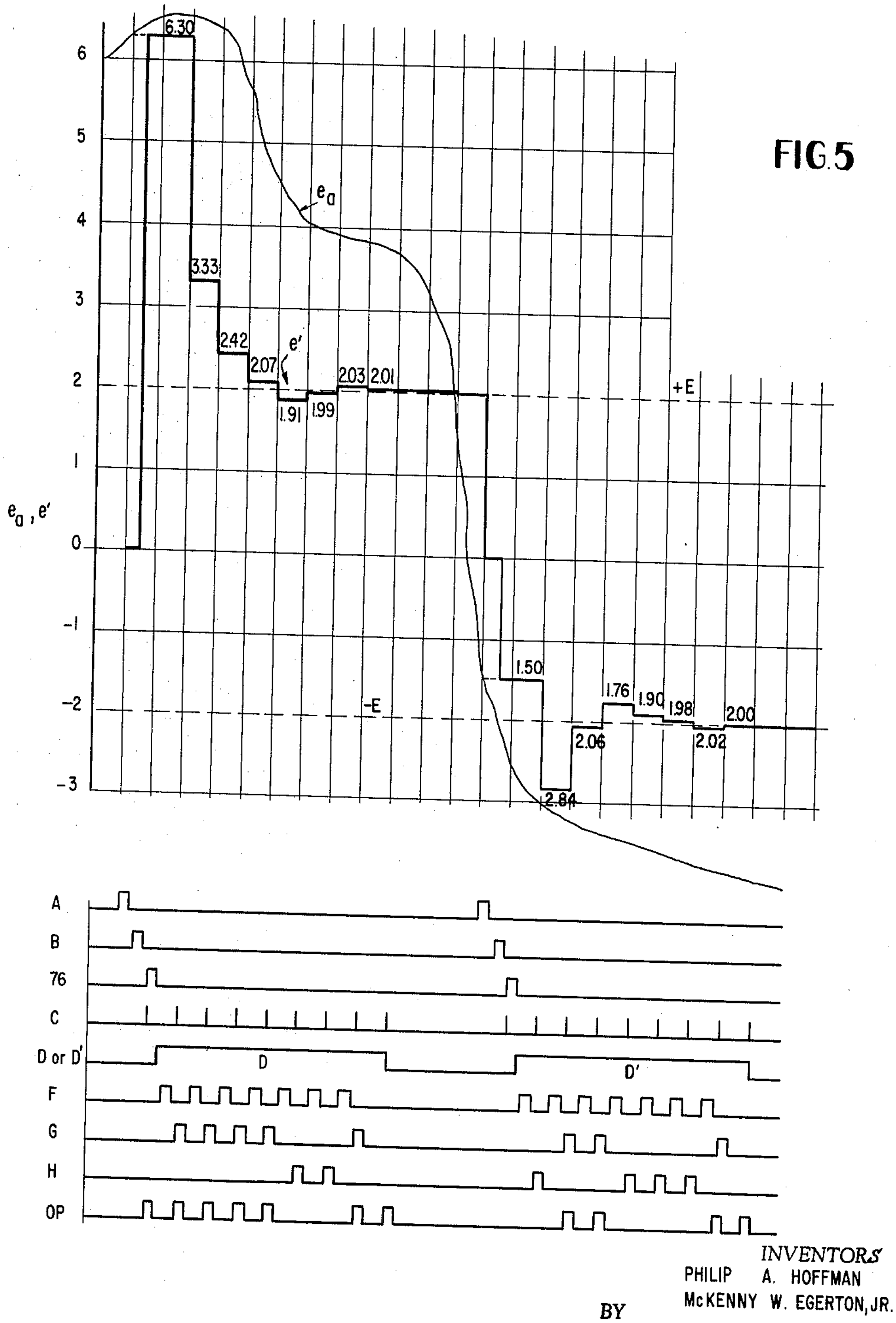
FIGURE 5 shows pulse and waveform diagrams for the circuit of FIGURE 4.

Reference voltages of both polarities are provided so that either positive or negative analog input voltages can be converted or encoded. The proper reference voltage is selected by switches D and D′, and one of these switches is closed near the beginning of each encoding cycle. The pulse outputs from the programmer 82 for controlling the switches over two encoding periods are illustrated in FIGURE 5.

In accordance with previous explanation, the programmer of the converter is designed so that if $e'$, the output of the —G amplifier 16, is greater in magnitude than the reference voltage after an operation of switch F, switch G is operated, and also one of switches I through O is operated, depending upon which of the factors in Table II is required. The voltage across capacitor $C_1$ is thereby divided by the factor $$\frac{C+C_1}{C}$$

where C represents the capacitance of $C_2$ in series with one of capacitors $C_3$ . . . $C_8$; that is, the voltage across capacitor $C_1$ is multiplied by a factor which is less than unity. On the other hand, if the magnitude of the voltage $e'$ is less than the magnitude of the reference voltage, switch H is operated together with one of switches I through O. In other words, the voltage across capacitor $C_1$ is multiplied by a factor which is greater than unity. Moreover, switches I through O are operated in sequence so that the multiplying factors $$\frac{C_1+C}{C} \text{ and } \frac{C}{C_1+C}$$

are changed from one bit to the next. Specifically, the first multiplier is relatively large, and succeeding multipliers decrease, as is shown in Table II. The result of these switching operations is to make $e'$ approach E, as shown in FIGURE 5. For an output number with 8 quantity bits as shown in FIGURES 4 and 5, the sizes of the capacitors are selected so that the result of the operation of switches G or H and I is multiplication by $p^{\pm 64}$; the result of the operation of switches G or H and J is multiplication by $p^{\pm 32}$, and so forth in accordance with Table II.

To clarify further the relationship between the voltages of the comparator inputs and the operations of switches G and H, it may be stated that, for positive analog input voltages, switch 66 will be closed in order to provide a positive reference voltage to comparator input 64. Then, when comparator input 60 is more positive than comparator input 64, switch G operates. Conversely, when comparator input 60 is less positive than comparator input 64, switch H operates. On the other hand, for negative analog input voltages, switch 68 will be closed in order to provide a negative reference voltage to comparator input 64. In this case, when comparator input 60 is more negative than comparator input 64, switch G operates. However, when comparator input 60 is less negative than comparator input 64, switch H operates. The selection of the method of operation to be used is accomplished by means of logic circuits in the comparator or in the programmer. These logic circuits are preferably operated at the same time that switch 66 or switch 68 is closed.

The operations of the circuit in FIGURE 4 will now be explained in greater detail. Upon receipt at terminal 84 of an encode command pulse, both poles 20 and 52 of switch A are closed and opened. This operation charges capacitor $C_0$ to a voltage which is proportional to the analog input voltage $e_a$ and also discharges capacitor $C_1$. Next switch 12, which is labelled B, is closed and opened, and all of the charge on capacitor $C_0$ is transferred to capacitor $C_1$. Unless stated otherwise in the following description it will be assumed that the circuit constants are chosen so that the voltage which appears across $C_1$ has the same magnitude as $e_a$. Switch 76 is then closed, connecting input 64 of the comparator to ground, and at the same time a pulse on wire 88 causes the comparator to make a comparison between the voltages at inputs 60 and 64. As noted in the preceding paragraph, if the analog input voltage is positive, the voltage at input 60 will also be positive and switch 66 will be closed at the same time that switch 76 is opened. On the other hand if the analog input voltage is negative, switch 68 will be closed at the same time that switch 76 is opened. After either switch 66 or 68 is closed, it remains closed for the remainder of the encoding cycle.

Just after switch 66 or 68 is closed, the two poles 26 and 28 of switch F are closed and opened. This operation charges capacitor $C_2$ to the voltage $e'$.

Next, a second pulse on wire 88 causes a second comparison to be made. If the analog input voltage is positive, and if the voltage at input 60 is greater in magnitude than E, switches G and I are operated. Switches I and $S_3$ are ganged; therefore capacitor $C_3$ is discharged at the same time that switch I operates. In accordance with the explanation for FIGURE 3, these switching operations divide the charge on capacitor $C_1$ by the amount $$\frac{C_1+C_2}{C_2}$$

On the other hand, if the voltage $e'$ is less than the voltage E, switches H and I are operated, and the charge on capacitor $C_1$ is multiplied by the factor $$\frac{C_1+C_2}{C_1}$$

in accordance with the explanation of FIGURE 2.

In the following bit period the pattern of switching operations is similar to that described in the preceding paragraph, except that switches G and J or H and J are operated. Moreover, switch $S_4$ is ganged with switch J so that capacitor $C_4$ is discharged at the same time that switch J operates. This general procedure is continued for the remaining bits in the digital output number, and switches K, L, M etc., are operated in sequence for the successive binary digits.

The sizes of capacitors $C_1$, $C_2$, $C_3$, $C_4$, etc. are selected to provide the factors which are given in Table II. The sizes for the various factors may be calculated from Equations 29 and 33. That is, the first multiplication or division is by the factor $$p^{\pm 2^{b-2}}$$

where the plus sign represents a multiplication and the minus sign represents a division. Similarly, the second factor is $$p^{\pm 2^{b-3}}$$

and so on for the other factors.

It will be noted from the foregoing explanation that the first pulse position if the digital output number represents the polarity of the analog input signal. According to the design of the programmer, the presence of a pulse in the first pulse position may be made to signify a positive analog input voltage, or conversely the presence of a pulse may be made to signify a negative analog input voltage. In the preferred embodiment of our invention, a pulse in the first position represents a positive analog input voltage. Also, the programmer may be designed so that the polarity bit is in the final position of the digital output number, but it is more usual for the polarity pulse to be in the first position. The second pulse position in the digital output number represents the most significant quantity bit, and the remaining pulse positions represent quantity bits of decreasing significance.

The comparator decision and switching operations which produce the least significant digit require further explanation. The important point is that, after the comparator decision which determines the least significant bit, operations of switch F and of switch G or switch H are not necessary. This is so because the comparator decision by itself provides the information which enables the programmer to produce a pulse or a no-pulse as required. Therefore, if the polarity pulse is considered to be part of the digital output number, the number of switches I, J, K etc. together with their associated capacitors, will be less than the number of digits in the digital output number by 2, since the polarity bit does not require an operation of switches I, J, K etc., and neither does the least significant quantity digit. The preceding statements about switch operations for the least significant digit will require some modifications for a type of converter which is used principally in voice communication, and these modifications will be described later.

Typical encoding cycles for the logarithmic converter will now be described for the particular examples shown in FIGURES 4 and 5. In FIGURE 5, the analog input wave is shown as $e_a$, and the voltage $e'$ across capacitor $C_1$ is shown on the same coordinate axes. The lower section of FIGURE 5 shows the pulses which occur at various points in FIGURE 4. In general, a switch is closed when the wave which represents the pulse to it is above the axis; otherwise the switch is open. The time sequence of the pulses is correct but the indicated time between pulses is representative only, and in an actual converter the times between pulses may vary from those shown. At the time the first sample is taken, the analog input voltage is positive, and its magnitude is greater than the magnitude of the reference voltage. The analog input is sampled upon receipt of the encode command pulse which operates switch A and which also causes capacitor $C_1$ to be discharged. The charge on capacitor $C_0$ is then transferred to capacitor $C_1$ by an operation of switch B. It will be assumed that the gain from the analog input to capacitor $C_1$ is unity so that the analog input voltage $e_a$ appears across $C_1$. Switch 76 is momentarily closed at the same time that the first trigger pulse is applied to the comparator. Since the analog sample has a positive polarity, switch D thereupon is closed and remains closed during the remainder of the encoding cycle. For this example, a pulse in the first pulse position of the digital output number will indicate a positive analog input voltage, and a no-pulse will indicate a negative analog input voltage. Therefore, for the first encoding cycle in FIGURE 5, a pulse appears in the first pulse position. However, suitable inhibitor circuits in the programmer prevent this pulse from operating any of the other switches. Since in the present example the voltage across $C_1$ is greater than the reference voltage E, the next trigger pulse to the comparator results in the operation of switches G, I, and $S_3$.

From FIGURE 5, it will be observed that the reference voltage E has been selected to be 2 volts. Furthermore, the base of the logarithmic output number will be selected to be 1.01, $e_{max}$ to be 7.03 volts, and $e_{min}$ to be 0.569 volt. Since there are eight quantity bits, the foregoing operations of switches G and I divide the analog input voltage by the quantity $1.01^{64}$ or 1.8905. The sampled value of $e_a$ is 6.3000 volts, and therefore $e'$ becomes 3.3325 volts at the beginning of the next bit period. The comparator recognizes a binary 1 as the most significant quantity bit inasmuch as a division of $e'$ took place.

Since the magnitude of $e'$ is still larger than the reference voltage of two volts, the comparison which follows the first operation of switches G and I results in operations of switches G, J, and $S_4$. This sequence is continued until the voltage across $C_1$ becomes less than the reference voltage E (2 volts). In the example under consideration, this occurs after the fourth operation of switch G. As a result of the following comparison switches H, M, and $S_7$ operate, and switch H continues to operate until $e'$ again exceeds the reference voltage.

The encoding process continues as previously described until nine bits, including the polarity bit, have been determined. In all cases the encoder recognizes an operation of switch G as equivalent to a binary 1, and switch H as equivalent to a binary 0.

It will be noted from FIGURE 5 that nine comparator pulses are required to generate a 9-digit binary output number. However, only 7 operations of switch F are required. As stated previously, this is because an operation of switch F is not required for the polarity bit, and also an operation of switch F is not required for the least significant bit. Furthermore, it will be noted that the total number of operations of switches G and H is seven, the same number as for switch F.

After completion of the previous encoding cycle, another sample of the analog input voltage is taken when an encode command pulse is received. In the example in FIGURE 5, this sample has a negative polarity, and the magnitude of the sample is less than the magnitude of the reference voltage. Therefore, when the first comparator pulse occurs, switch D′ is closed to provide a negative reference voltage. Also, the connections to switches G and H are reversed so that switch G operates when $e'$ is more negative than —E, and conversely switch H operates when $e'$ is less negative than —E. Moreover, the first pulse position in the output pulse train contains a no-pulse to indicate the negative polarity of the analog input sample. Since the magnitude of the analog input sample is smaller than the magnitude of the reference voltage, the second comparator pulse results in operations of switches H and I. These operations cause the analog input sample to be multiplied by the factor 1.8905, and the second pulse position in the digital output number is also a no-pulse. Switching operations continue according to previous explanation as shown in FIGURE 5 until the encoding cycle is complete.

From the procedures which have just been described, it is evident that analog voltage samples which are greater than 7.03 volts will result in the output number 11 . . . 11. Furthermore, analog samples which are less than 0.569 volt will result in the output number 00 . . . 00.

Figure 6:
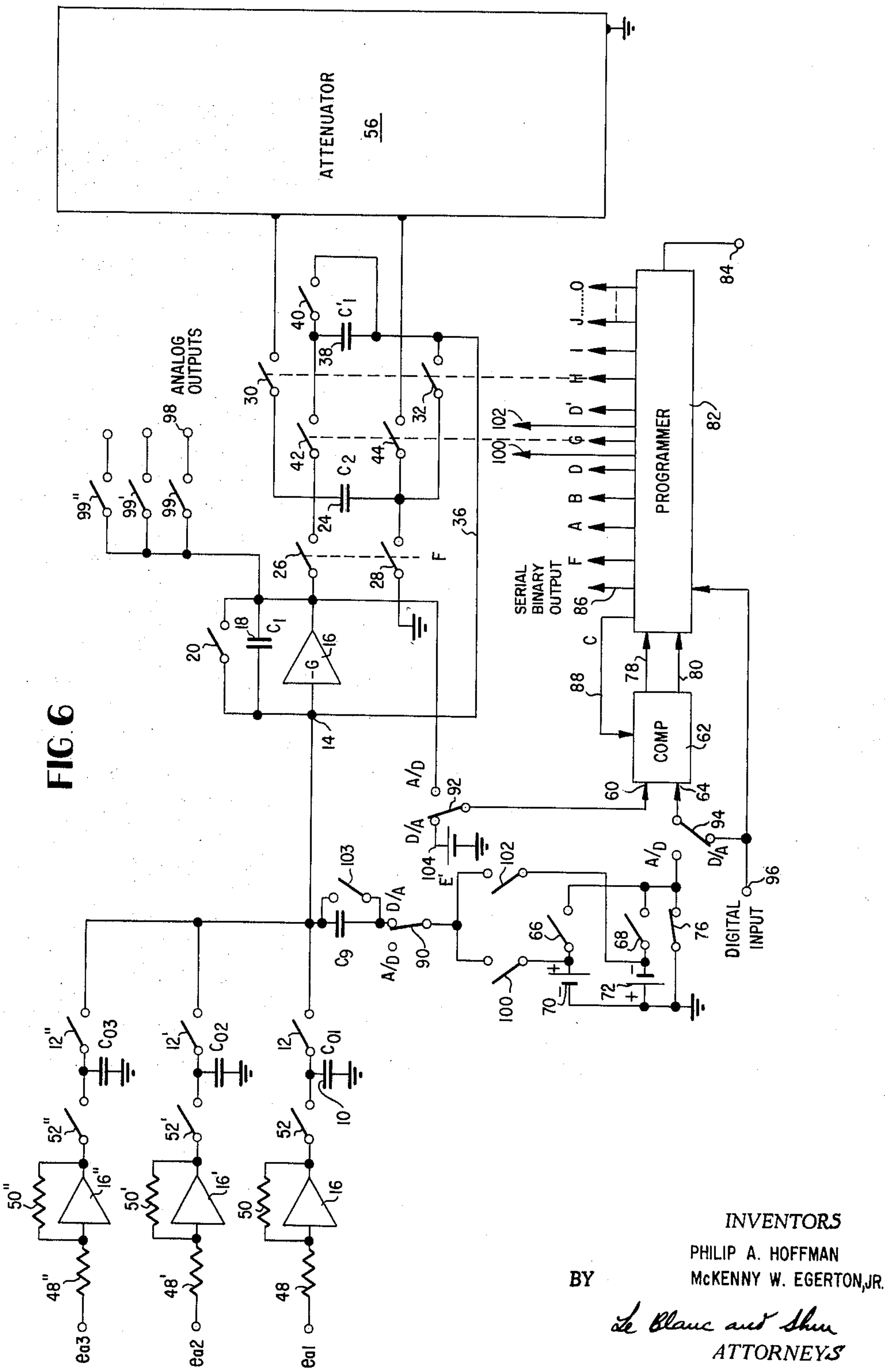
FIGURE 6 shows a complete reversible converter of the type illustrated in FIGURE 4.

FIGURE 6 shows a circuit diagram for a complete reversible converter, the analog to digital portion of which is shown in FIGURE 4. Like parts bear like reference numerals in FIGURES 4 and 6. Moreover, means for multiplexing analog inputs for analog to digital conversions, and digital inputs for digital to analog conversions are shown in FIGURE 6, and these multiplexing means will be described below.

For two-way conversion, three manual switches 90, 92 and 94 are provided to permit analog to digital or digital to analog conversion at the choice of the operator. Also, other switches, not shown, are provided in the comparator or programmer for purposes which will be described later. Alternatively, these manual switches can be electronically controlled by a suitable command pulse. The arm of each of the switches is movable from one to the other of two terminals, respectively labelled *D/A* for digital to analog conversion and *A/D* for analog to digital conversion. As illustrated in FIGURE 6, the switches are in the position for digital to analog conversion. Switches 90, 100, and 102 couple the batteries 70 and 72 to capacitor $C_9$, the purpose of which will be explained in a later paragraph. Switch 92 disconnects the output of the operational amplifier from the comparator input 62, and connects the comparator input to a reference voltage 104 which is labelled E′. Switch 94 connects input 64 of the comparator to a digital input terminal 96. The analog output signals are derived from analog output terminals 98 connected to the output of the operational amplifier 16. Additional analog inputs such as those labelled $e_{a2}$, $e_{a3}$ may be provided and serially connected in time sequence to amplifier 16 to provide multiplexing for a plurality of analog inputs.

Except for the multiplexing circuits the operation of the circuit in FIGURE 6 for analog to digital conversions is the same as for the circuit in FIGURE 4. As noted previously, there is provision in FIGURE 6 for three multiplexed analog inputs, but this number may be increased or decreased. The multiplexer circuits include amplifiers 16, 16′, and 16″ and their associated resistors, switches 52, 52′, 52″, 12, 12′ and 12″, and capacitors $C_{01}$, $C_{02}$, and $C_{03}$. The operation of the multiplexer is described in copending application Serial No. 69,454. Briefly, switches 52, 52′, 52″ are momentarily closed in order to sample the corresponding analog inputs. These switches may be closed simultaneously or in sequence. Thereafter, switch 12, for example, is closed and the charge on capacitor $C_{01}$ is transferred to capacitor 18. This charge is encoded in accordance with previous explanation. Thereafter, switch 12′ is momentarily closed, the charge on capacitor $C_{02}$ is transferred to capacitor 18, and another encoding cycles takes place. After this, switch 12″ is momentarily closed, and a third encoding cycle is initiated. It is not necessary that samples of the analog sources be encoded in rotational sequence, and this sequence has been given merely as an example. For instance, another sampling sequence might be $e_{a1}$, $e_{a2}$, $e_{a1}$, $e_{a3}$, $e_{a1}$, etc., the particular sequence being determined by the requirements of the system in which the multiplexer and converter are designed to operate. It is, of course, necessary that the programmer be provided with sufficient outputs to operate all the switches in proper sequence, but for simplicity the additional outputs are not shown in FIGURE 6.

The operation of the circuit in FIGURE 6 will now be explained for digital to analog operation. It will be assumed that the digital input pulse train is composed of positive pulses rising from a zero baseline, and that, when multiplexing is involved, the pulse positions at the beginning of a word are used for a code which identifies the several channels from each other. Moreover, the channel code pulses are preceded by one or more synchronizing pulses. Thus the channel codes determine which of switches 99, 99′, 99″ shall be closed to provide the analog output voltage. Although provisions for three multiplexed channels are shown in FIGURE 6, this number may be increased or decreased. It will be further assumed that the pulse position which follows the channel code pulse positions will determine the polarity of the analog output. In particular it will be assumed that a pulse will designate a positive analog output, and that a no-pulse will designate a negative analog output. The pulse positions which follow the polarity pulse position are the quantity digits, and it will be assumed that a pulse represents a binary 1 and that no-pulse represents a binary 0. Other arrangements of the digital input pulse train could be used, but the one just described is typical and will serve as an example.

In FIGURE 6, the battery 104, which is labelled E′, provides a positive bias to input 60 of the comparator 62. The voltage of this battery is not critical but it should be about one half of the peak voltage of the digital input pulse train.

It will be recalled from previous explanation that a digital to analog conversion is effected by means of multiplications and divisions of an initial or reference voltage on capacitor $C_1$. The means for placing the reference voltage on capacitor $C_1$ include capacitor $C_9$ and switches 100, 102, and 103. Charge is placed on capacitor $C_1$ by a transfer process similar to that described in connection with FIGURE 2. For example, if a positive analog output voltage is to be obtained, switches 103 and 20 are momentarily closed in order to discharge capacitors $C_9$ and $C_1$. Then, switch 102 is momentarily closed, and capacitor $C_9$ receives a charge. It will be recalled that the feedback action of amplifier 16 maintains point 14 at essentially ground potential. Therefore, capacitor $C_9$ charges up to the full voltage of battery 70, and the same charge passes on to capacitor $C_1$. Hence the voltage which appears across capacitor $C_1$ is $$\frac{C_9}{C_1}E$$

with the right hand terminal positive. For the example to be described below, it will be assumed that $C_1=C_9$, and therefore the voltage across capacitor $C_1$ will be E.

The digital input pulse train which is applied to digital input terminal 96 will cause the operation of various switches as explained below. It is necessary, of course, that the trigger pulses on wire 88 be synchronized with the pulse positions in the digital input pulse train. Moreover, the logic circuits in the comparator or programmer will be connected, by the switches previously noted, so that switch G operates when comparator input 60 is more positive than comparator input 64, and so that switch H operates when comparator input 60 is less positive than comparator input 64. This connection is the same as was mentioned in connection with FIGURE 4 for positive analog inputs in an analog to digital conversion.

When a digital input pulse train is impressed on the digital input terminal 96, the synchronizing pulses, as assumed previously, establish synchronism of the programmer with the pulse train. The channel code pulses determine which multiplexed channel is active, and the appropriate switch 99, 99′, or 99″ is closed. Also, switches 20 and 103 are momentarily closed. The next input pulse position determines the polarity of the analog output voltage. As noted previously, if the analog output voltage is to be positive, switch 102 is momentarily closed. However, if the analog output voltage is to be negative, switch 100 is momentarily closed. Thereafter, the quantity pulse positions cause operations of switches G and H. In particular, an input pulse leads to a momentary closing of switch H, that is, to a multiplication of the voltage on capacitor $C_1$. Conversely, a no-pulse leads to a momentary closing of switch G, that is, to a division of the voltage on capacitor $C_1$.

The factors by which the voltage on capacitor $C_1$ are multiplied or divided are those shown in Table II, and therefore an analog output voltage is generated in accordance with Equation 27. Thus, at the completion of a digital to analog encoding cycle, an analog voltage appears at one of the analog outputs 99, 99′, or 99″, and this voltage is a representation of the antilogarithm of the quantity bits of the digital input pulse train. Moreover, the polarity of the analog output voltage corresponds to the presence or absence of a pulse in the polarity pulse position.

It is to be noted further that, in accordance with Equations 13 and 27, a digital output from the converter, when operating as an analog to digital converter, if later applied to the converter when the switches are in the digital to analog positions, will produce the antilogarithm of the digital input so as to reconstruct, within the limits of accuracy and resolution of the converter, the exact original analog signal.

It should also be noted that for digital to analog conversion the attenuator 56 in FIGURE 6 must contain as many steps as there are quantity bits in the digital input signal. Similarly, there must be as many operations of switch F as there are quantity bits in the digital input signal.

Figure 7:
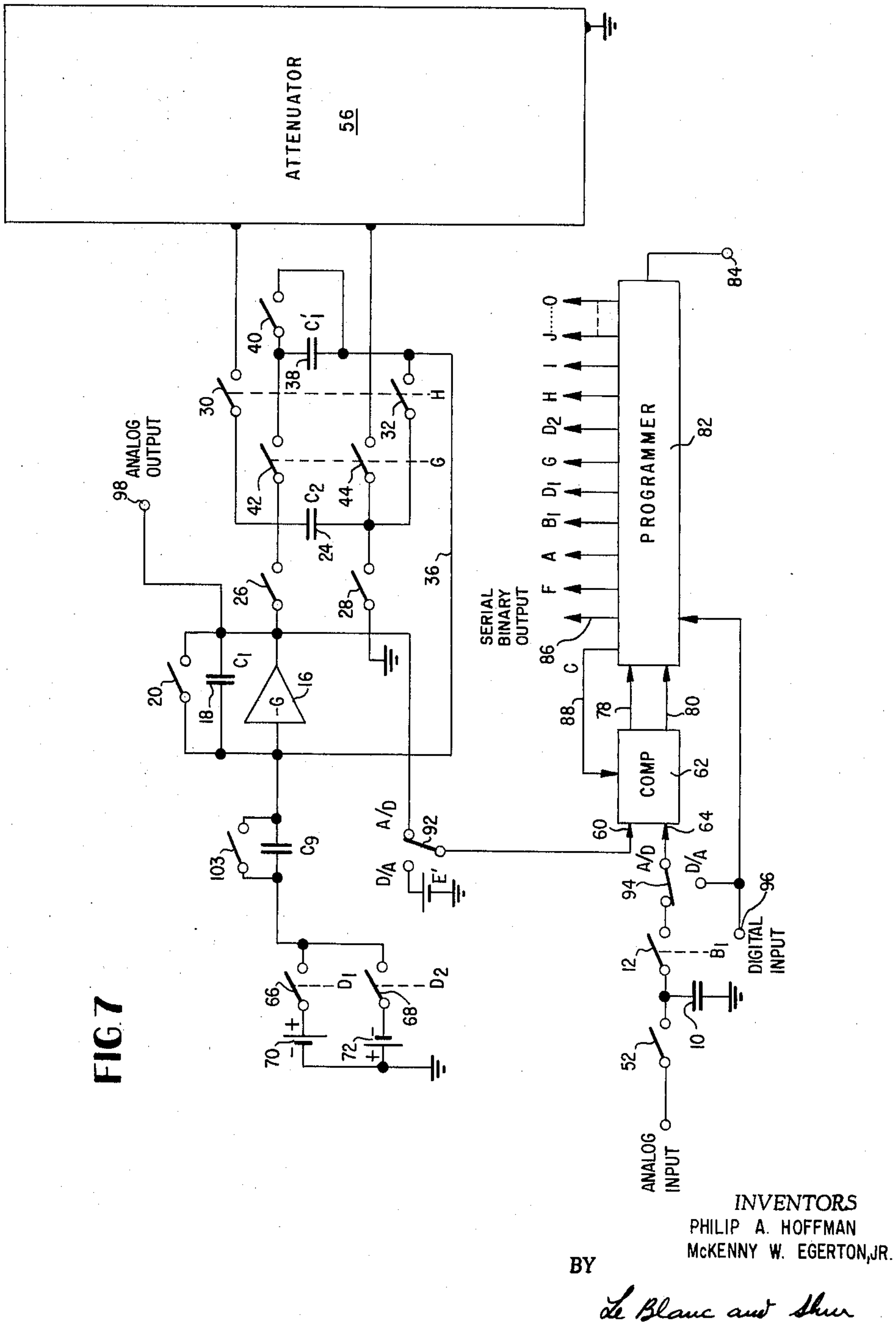
FIGURE 7 shows a modified reversible converter constructed in accordance with the present invention.

FIGURE 7 shows a reversible converter constructed in accordance with the present invention embodying the second mode of operations referred to above, wherein multiplications and divisions are performed on an initial or reference voltage rather than upon the analog input voltage. In the converters of FIGURES 4 and 6, the operation of the converter performs multiplications and divisions upon the analog input voltage in such a manner that the result approaches the value of the reference voltage. On the other hand, in FIGURE 7, the multiplications and divisions on the initial or reference voltage produced a voltage that approaches the value of the analog input voltage.

The converter in FIGURE 7 contains many elements which are the same as those in FIGURES 4 and 6, and like parts bear like reference numerals. In particular, the voltage on capacitor $C_1$ is divided by an operation of switch G, and is multiplied by an operation of switch H. The factors of multiplication and division are those shown in Table II. For both analog to digital and digital to analog conversions, a reference voltage is initially placed on capacitor $C_1$ by means of batteries 70, 72, switches 66, 68, capacitor $C_9$, and switch 103. The process of charge transfer is the same as that described in connection with digital to analog conversion for FIGURE 6. Moreover, in FIGURE 7, for digital to analog conversions, the digital input pulse train is impressed on terminal 96, and the explanation of the operation of the converter is the same as for FIGURE 6.

For analog to digital conversions in FIGURE 7, the analog input voltage is sampled by a momentary closure of switch 52, and the sample is stored on capacitor 10. After the sampling operation, switch 12 is closed and remains closed for the remainder of the encoding cycle. Thus the sampled value of the analog input voltage is impressed on input 64 of the comparator 62. It is important that leakage currents through the switches and otherwise be sufficiently small so that the voltage across capacitor 10 does not change significantly during an encoding cycle. Provisions for additional analog inputs could be made so that the multiplexed operation could be obtained.

At the same time that the operations in the preceding paragraph are being performed, it is necessary that a reference charge be placed on capacitor $C_1$. Moreover, this reference charge must have the proper polarity. To accomplish this, switch 20 is momentarily closed at the same time that switch 52 is closed. The closure of switch 20 discharges capacitor $C_1$ and brings input 60 to the comparator to ground potential. The polarity of input 64 to the comparator will be the same as the analog input voltage, and therefore the output of the comparator, upon first interrogation, represents the polarity of the analog input voltage. This comparator output is then processed by the programmer, and switch 66 or 68 is momentarily closed. In particular, if the analog input voltage is positive, switch 68 is operated, whereas if the analog input voltage is negative, switch 66 is operated. The operations of switch 66 or 68 place a reference charge on capacitor $C_1$ in accordance with previous explanation.

The procedure for logarithmic analog to digital conversion for the circuit in FIGURE 7 contains similarities to the procedure described for FIGURES 4 and 6. That is, for positive analog input voltages, if the voltage at terminal 60 of the comparator is positive with respect to terminal 64, switch G is operated, and the voltage on capacitor $C_1$ is divided by one of the factors in Table II. However, for the circuit in FIGURE 7 a division is recognized as a binary 0. On the other hand, if the voltage at terminal 60 is less positive than the voltage at terminal 64, switch H is operated to perform a multiplication of the voltage on capacitor $C_1$, and a binary 1 is recognized. In other words, the programmer 82 is designed so that a multiplication is recognized as a binary 1, and a division is recognized as a binary 0. The requirement for this follows from the explanation for Equation 17.

Figure 8:
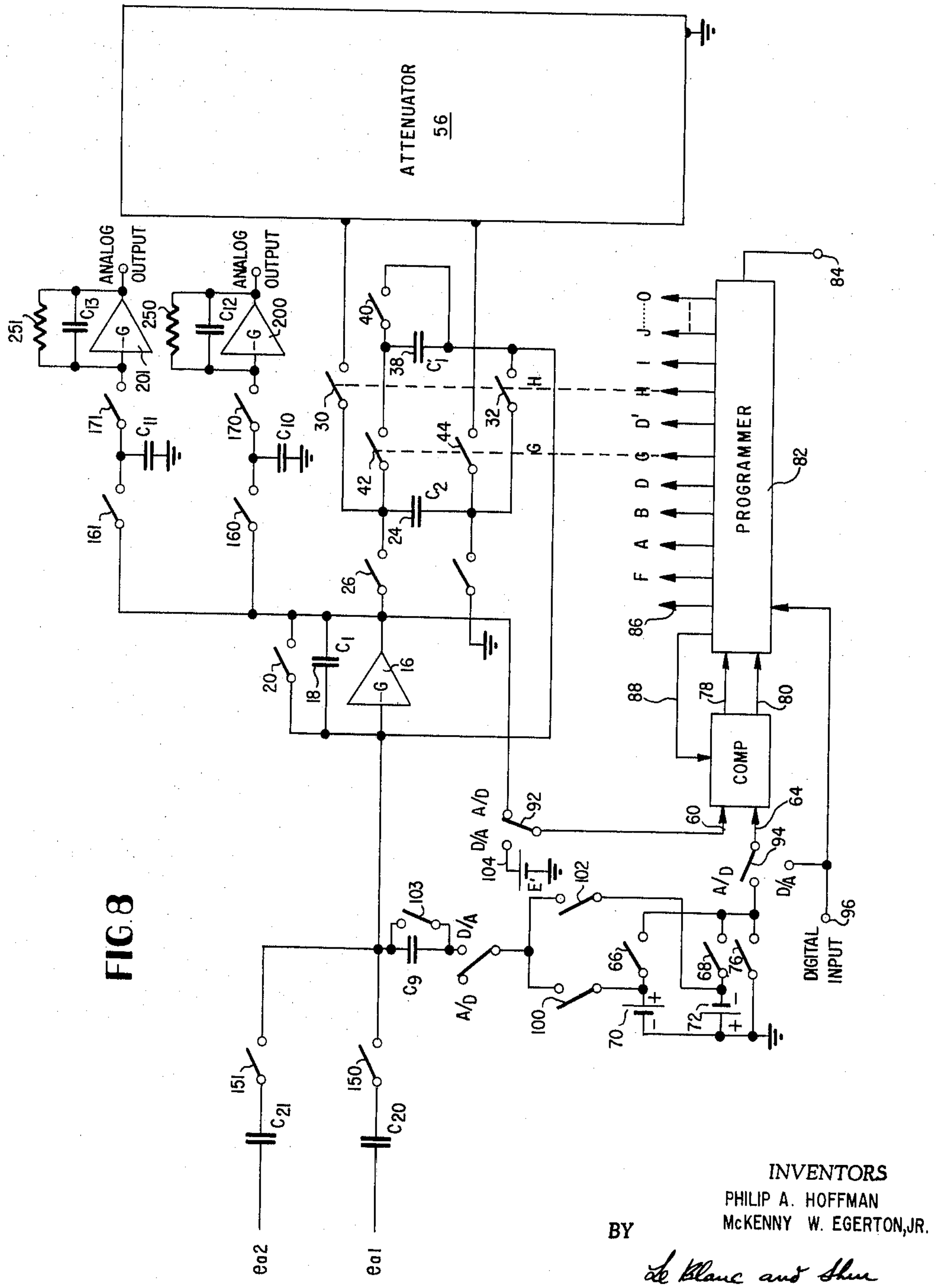
FIGURE 8 shows a logarithmic differential converter capable of accepting multiple inputs.

For some applications, an example of which is the transmission of voice signals, companded differential PCM encoding has advantages in comparison with encoding the full value of the analog sample in each encoding cycle. For a discussion of differential PCM and of companding, reference is made to an article entitled "Pulse Code Modulation" by J. S. Mayo which was published in the November 1962 issue of Electro-Technology. Multiplexed differential PCM encoding with logarithmic companding is provided by the circuit which is shown in FIGURE 8. Two multiplexed channels are shown, but the number may be increased.

The circuit in FIGURE 8 is similar to the circuit in FIGURE 6 except that the analog inputs are impressed on amplifier 16 through capacitors $C_{20}$ and $C_{21}$, and integrating circuits are provided for the analog outputs. As a brief example, it will be assumed that capacitors $C_1$ and $C_{20}$ are both discharged. Next, switch 150 is momentarily closed, whereupon both capacitors charge up to the instantaneous value of $e_{a1}$, the analog input voltage (provided $C_1 = C_{20}$). This voltage is then encoded in accordance with previous explanation, after which switch 20 is momentarily closed a second time. It is to be noted that the charge which was placed upon capacitor $C_{20}$ by the first closure of switch 150 remains on capacitor $C_{20}$. Therefore, when switch 150 is closed a second time the charge on capacitor $C_{20}$ changes by an amount which represents the change in the analog input voltage between the two switch closures. Moreover, this change in charge flows on to capacitor $C_1$. Thus capacitor $C_1$ becomes charged to a value which represents the difference between two consecutive samples of the analog input voltage $e_{a1}$. The differential charge is then encoded as previously described, and a pulse train which represents the logarithm of the difference between the two values of the analog input voltage appears at terminal 86 of the programmer. This process is repeated, and each encoding represents the logarithm of the difference between the present sample of the analog input voltage and the previous sample. When multiplexed circuits are used, as in FIGURE 8, a typical operation would be alternate closures of switches 150 and 151.

The operation of the circuit in FIGURE 8 for digital to analog conversions is the same as previously described for FIGURE 6 with the exception of the integrator circuits in the analog output leads. The purpose of the integrator circuits is to add together the successive voltages which represent the differences between the successive analog input voltage samples which were encoded by a differential analog to digital converter. The integrator circuits which are shown operate in the same manner as amplifier 16 and its associated capacitors. Upon completion of a digital to analog conversion cycle, switch 160, say, is momentarily closed. This operation charges capacitor $C_{10}$ to the output voltage of amplifier 16. Thereafter, switch 170 is momentarily closed and all of the charge on capacitor $C_{10}$ is transferred to capacitor $C_{12}$. By this means, successive increments of charge are transferred to capacitor $C_{12}$, and the voltage across capacitor $C_{12}$ represents the sums of the anti-logarithms of the differential digital inputs. The resistor across capacitor $C_{12}$ prohibits leakage currents from the amplifier from overcharging the capacitor and also makes correction for transmission errors. The time constant of the resistor and capacitor $C_{12}$ is long in comparison with an encoding cycle. For multiplexed digital to analog conversion, suitable trigger signals must be supplied to switches 160, 161, 170, and 171 to operate them in accordance with the required multiplexing sequence.

Figure 9:
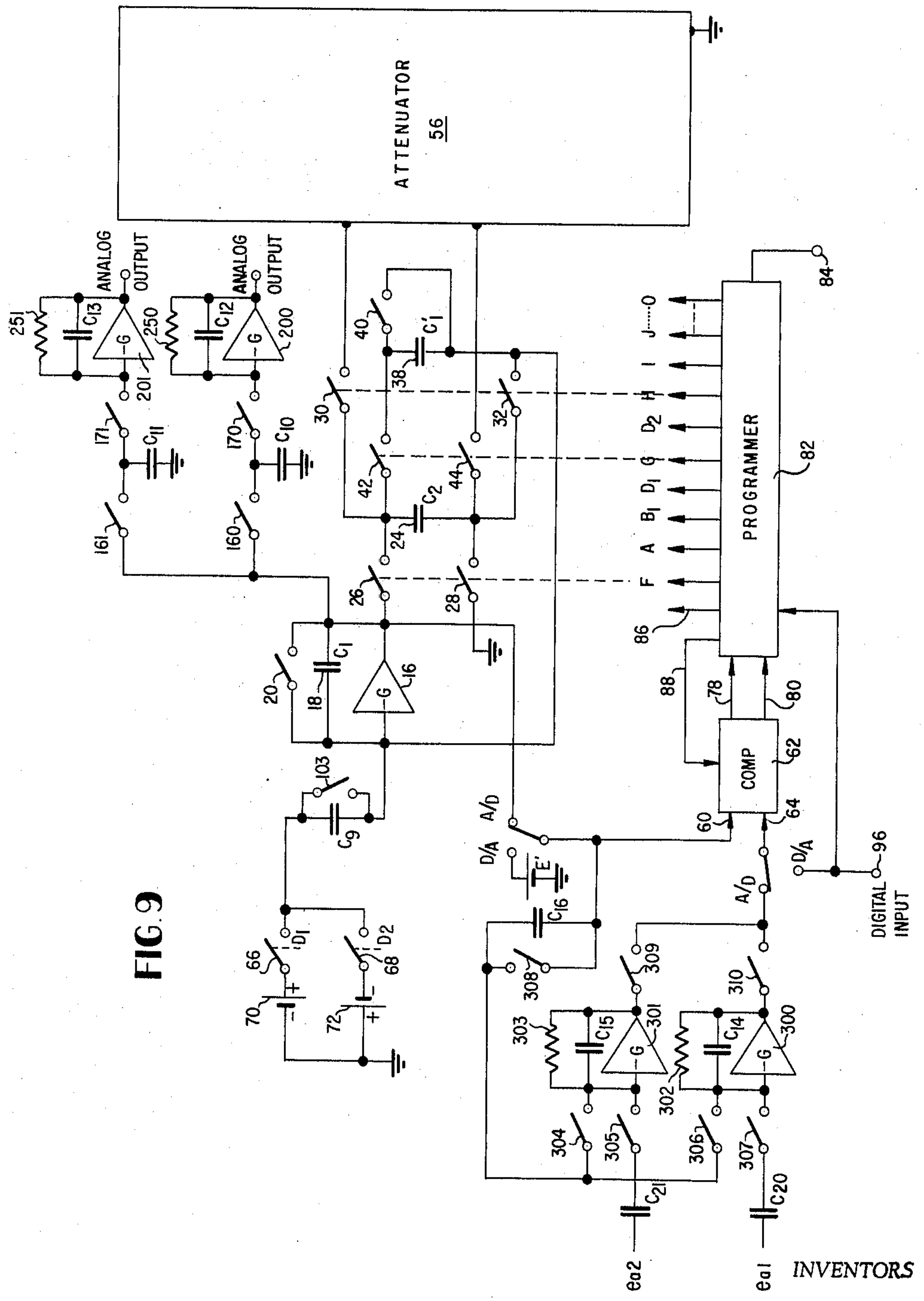
FIGURE 9 shows a further converter with provision for minimizing the effects of quantizing errors.

It has been stated previously that, for analog to digital conversions, the charge remaining on capacitor $C_1$ at the end of an encoding cycle is less than a resolution element. Nevertheless, for some applications this charge is important and it is desirable to apply the remaining charge to the next encoding cycle. A multiplexed reversible logarithmic analog-digital converter in which the charge residue is preserved and applied to the succeeding encoding cycle is shown in FIGURE 9. It will be noted that FIGURE 9 utilizes the second mode of operation wherein, for analog to digital conversions, a reference voltage is applied to capacitor $C_1$. Many of the elements of FIGURE 9 are the same as have been shown in previous figures and like circuit elements are identified by like reference numerals.

The operation of forming differential samples of the analog input voltages is the same as was described for FIGURE 8 except that amplifiers 300 and 301 are used in place of amplifier 16. For example switch 307 is momentarily closed, and capacitor $C_{14}$ receives an increment of charge which represents the difference between the value of the present sample of the analog input voltage and the value of the preceding sample. The voltage corresponding to the increment of charge is then impressed on comparator input 64 by the closure of switch 310. Switch 310 remains closed for the duration of an encoding cycle. After switch 310 is closed, an analog to digital conversion proceeds as described for FIGURE 7. From the explanation for FIGURE 7, it will be recalled that the charge on capacitor $C_1$ at the end of an encoding cycle represents the analog input voltage to within less than one resolution element. However, in the present instance, it is necessary that there be an operation of switch F and of switch G or H after the last quantity bit in order that the remaining charge have the proper value. It is desired to add the charge corresponding to this fraction of a resolution element to the next increment of charge to be placed on capacitor $C_{14}$. In order to accomplish this, upon completion of an analog to digital conversion cycle, switch 308 is first momentarily closed in order to discharge capacitor $C_{16}$. Thereafter, switch 306 is momentarily closed and a charge flows into capacitor $C_{14}$ which is proportional to the output voltage of amplifier 16. This flow of charge is in accordance with previous explanation regarding charge transfer. This charge may be considered to consist of two components. The first component represents the differential analog sample, and is equal but of opposite polarity to the sample which was placed on capacitor $C_{14}$ at the beginning of the conversion cycle. The second component represents the quantizing error. Since the first component is equal but opposite to the charge already on capacitor $C_{14}$, these two charges cancel each other, provided the circuit elements are selected properly. Therefore, the second component of charge representing the quantizing error remains on capacitor $C_{14}$, and is added algebraically to the following differential sample when switch 307 is next closed.

The preceding explanation also applies to analog input $e_{a2}$ and to such other multiplexed analog inputs as may be used. It is necessary, of course, that the proper switches be operated as required by the multiplexing and conversion cycles.

For digital to analog conversion, the operation of the circuit in FIGURE 9 is the same as for FIGURE 8.

It is apparent from the above that the present invention provides a novel logarithmic converter which produces a true logarithm over the entire range within the accuracy of the device and that no mathematical approximation is involved. The converter includes provision for digital to analog conversion, for multiplexing and for differential conversion.

Various modifications and changes can be incorporated in the system. For example, the converter may be operated in the manner of the more conventional cascade converters involving separate comparators for each digit. Similarly, it is possible to use a simplified arrangement, wherein comparisons are made using only the smallest multiplier. Likewise, other suitable arrangements for minimizing the effects of accumulated quantizing errors may be provided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A signal generator for electrical converters comprising an operational amplifier having a feedback capacitor, means for placing a charge on said feedback capacitor, second and third capacitors, first switch means for coupling said second capacitor between the output of said amplifier and a reference potential, and second switch means for coupling said second and third capacitors in series between the input of said amplifier and said reference potential.

2. A signal generator according to claim 1 wherein said third capacitor is equal to said feedback capacitor.

3. A signal generator for electrical converters comprising an operational amplifier having a feedback capacitor, means for placing an initial charge on said feedback capacitor, second and third capacitors, first switch means for coupling said second capacitor between the output of said amplifier and a reference potential, second switch means for coupling said second capacitor between the input of said amplifier and said reference potential, and third switch means for coupling said second and third capacitors in series between the input of said amplifier and said reference potential.

4. A signal generator according to claim 3 including attenuating means, and means for coupling said attenuating means in series with said second capacitor between the input of said amplifier and said reference potential.

5. A signal generator according to claim 4 wherein said attenuator includes means for providing variable attenuation.

6. A signal generator according to claim 5 wherein said attenuator comprises a capacitive ladder network and switch means for activating various portions of said network.

7. A logarithmic analog to digital converter comprising an operational amplifier having a feedback capacitor, means for placing a sample of an analog input voltage on said feedback capacitor, second and third capacitors, first switch means for coupling said second capacitor between the output of said amplifier and a reference potential, second switch means for coupling said second capacitor between the input of said amplifier and said reference potential, and third switch means for coupling said second and third capacitors in series between the input of said amplifier and said reference potential, a variable attenuator, means for coupling said variable attenuator in series with said second capacitor between the input of said amplifier and said reference potential, a comparator, means for coupling the output of said amplifier to one input of said comparator, a reference potential source, means for coupling the other input of said comparator to said source, and means responsive to the output of said comparator for actuating said switch means.

8. A reversible converter comprising an operational amplifier having a feedback capacitor, means for placing a sample of an analog input voltage on said feedback capacitor, second and third capacitors, first switch means for coupling said second capacitor between the output of said amplifier and a reference potential, second switch means for coupling said second capacitor between the input of said amplifier and said reference potential, third switch means for coupling said second and third capacitors in series between the input of said amplifier and said reference potential, a variable attenuator, means for coupling said variable attenuator in series with said second capacitor between the input of said amplifier and said reference potential, a comparator, means for coupling the output of said amplifier to one input of said comparator, a reference potential source, means coupling the other input of said comparator to said source, means responsive to the output of said comparator for actuating said switch means, an analog output coupled to the output of said amplifier, a digital input, means for coupling said other input of said comparator to said digital input, and means for coupling said reference potential source to the input of said amplifier.

9. A reversible converter according to claim 8 including differential analog input means and integrating analog output means.

10. A reversible converter according to claim 9 including a plurality of said input and output means for multiplexing.

11. An analog to digital converter comprising an operational amplifier having a feedback capacitor, means for placing a reference voltage on said feedback capacitor, second and third capacitors, first switch means for coupling said second capacitor between the output of said amplifier and a reference potential, second switch means for coupling said second capacitor between the input of said amplifier and said reference potential, third switch means for coupling said second and third capacitors in series between the input of said amplifier and said reference potential, a variable attenuator, means for coupling said variable attenuator in series with said second capacitor between the input of said amplifier and said reference potential, a comparator, means for coupling the output of said amplifier to one input of said comparator, means for impressing a sample of an analog input signal on the other input of said comparator, and means responsive to the output of said comparator for actuating said switch means.

12. A converter according to claim 11 including means for discharging said feedback capacitor at the beginning of an encoding period.

13. A reversible converter comprising an operational amplifier having a feedback capacitor, means for placing a reference voltage on said feedback capacitor, second and third capacitors, first switch means for coupling said second capacitor between the output of said amplifier and a reference potential, second switch means for coupling said second capacitor between the input of said amplifier and said reference potential, third switch means for coupling said second and third capacitors in series between the input of said amplifier and said reference potential, a variable attenuator, means for coupling said variable attenuator in series with said second capacitor between the input of said amplifier and said reference potential, a comparator, means for coupling the output of said amplifier to one input of said comparator, means for impressing a sample of an analog input signal on the other input of said comparator, means responsive to the output of said comparator for actuating said switch means, an analog output coupled to the output of said amplifier, a digital input, and means for coupling said other input of said comparator to said digital input.

14. A reversible converter according to claim 13 including a plurality of differential analog input means and a plurality of integrating analog output means for differential multiplexing.

15. A reversible converter according to claim 13 including a fourth capacitor and switch means for coupling said fourth capacitor between the output of said amplifier and said analog input signal means to compensate for quantizing errors in said converter.

16. A binary analog to digital converter comprising charge signal storage means, means for placing an analog charge signal to be converted on said storage means, a comparator for comparing said charge signal with a predetermined reference value, means for periodically coupling said storage means to said comparator, reference potential means, a plurality of switching means coupling said storage means to said reference potential means for modifying the charge signal on said storage means, and a programmer coupled to said plurality of switching means, said programmer including means coupled to said comparator and responsive to the output of said comparator for actuating said switching means to modify the charge on said storage means by a factor M where $$M=p^{\pm 2^{b-2}} \cdot p^{\pm 2^{b-3}} \ldots p^{\pm 2^{-1}}$$

in which $p$ is a logarithmic base and $b$ is the number of bits in a binary number.

17. A converter according to claim 16 wherein said storage means is a capacitor.

References Cited by the Examiner

UNITED STATES PATENTS

| | | | |
|---|---|---|---|
| 2,817,704 | 12/1957 | Huntley | 340—347 |
| 2,912,163 | 11/1959 | Van Tuyl | 235—183 |
| 3,140,481 | 7/1964 | Hoffman | 340—347 |

DARYL W. COOK, *Acting Primary Examiner.*

MALCOLM A. MORRISON, *Examiner.*

K. R. STEVENS, J. F. MILLER, *Assistant Examiners.*